(12) United States Patent
Widder et al.

(10) Patent No.: US 10,813,378 B2
(45) Date of Patent: Oct. 27, 2020

(54) SUBSTANCE MIXTURES

(71) Applicant: SYMRISE AG, Holzminden (DE)

(72) Inventors: Sabine Widder, Holzminden (DE); Kathrin Langer, Dassel-Hilwartshausen (DE); Gerhard Krammer, Holzminden (DE); Olga Pauli, Holzminden (DE); Cornelia Homner, Holzminden (DE)

(73) Assignee: SYMRISE AG, Holzminden (DE)

( * ) Notice: Subject to any disclaimer, the term of this patent is extended or adjusted under 35 U.S.C. 154(b) by 582 days.

(21) Appl. No.: 15/310,191

(22) PCT Filed: Jun. 3, 2015

(86) PCT No.: PCT/EP2015/062464
§ 371 (c)(1),
(2) Date: Nov. 10, 2016

(87) PCT Pub. No.: WO2015/185674
PCT Pub. Date: Dec. 10, 2015

(65) Prior Publication Data
US 2017/0265511 A1 Sep. 21, 2017

(30) Foreign Application Priority Data

Jun. 5, 2014 (EP) .................................... 14171310

(51) Int. Cl.
| | | |
|---|---|---|
| *A23L 33/17* | (2016.01) | |
| *A23L 29/262* | (2016.01) | |
| *A23L 27/00* | (2016.01) | |
| *A23L 33/175* | (2016.01) | |
| *A23L 33/105* | (2016.01) | |

(52) U.S. Cl.
CPC .............. *A23L 33/17* (2016.08); *A23L 27/86* (2016.08); *A23L 29/262* (2016.08); *A23L 33/105* (2016.08); *A23L 33/175* (2016.08); *A23V 2002/00* (2013.01)

(58) Field of Classification Search
CPC ........ A23L 33/17; A23L 27/86; A23L 29/262; A23L 33/175; A23L 33/105
See application file for complete search history.

(56) References Cited

U.S. PATENT DOCUMENTS

| | | | | |
|---|---|---|---|---|
| 4,861,592 | A * | 8/1989 | Gottwald | ............. A61K 9/0095 424/687 |
| 4,980,193 | A * | 12/1990 | Tuason, Jr. | ............... A23G 1/56 426/573 |
| 5,075,114 | A | 12/1991 | Roche | |
| 5,807,603 | A * | 9/1998 | Lerchenfeld | ............... A23L 2/58 426/519 |
| 2006/0159759 | A1 | 7/2006 | Ohta et al. | |
| 2008/0107786 | A1* | 5/2008 | Barnekow | ................ A23F 5/405 426/533 |
| 2011/0135786 | A1 | 6/2011 | Milici et al. | |
| 2011/0195115 | A1 | 8/2011 | Tanaka et al. | |

OTHER PUBLICATIONS

"Sodium Carboxymethylcellulose" Sigma Aldrich. Web archive date of Jun. 17, 2013 https://web.archive.org/web/20130617152312/ https:/www.sigmaaldrich.com/catalog/product/aldrich/419273?lang= en®ion=US (Year: 2013).*
"Total Amino Acids in Cocoa Powder" Retrieved Oct. 21, 2019 https://tools.myfooddata.com/protein-calculator.php?foods=19165- 19165-19165&serv=wt1-wt1-wt1&qty=1-1-1 (Year: 2019).*
Pangbom et al, "Effect of Hydrocolloids on Apparent Viscosity and Sensory Properties of Selected Beverages," Journal of Texture Studies vol. 9, No. 4, Jan. 1, 1978, pp. 415-436.
Hou et al, "Optimization of enzymatic hydrolysis of Alaska pollock frame for preparing protein hydrolysates with low-bitterness," LWT— Food Science and Technology vol. 44, No. 2, Mar. 1, 2011, pp. 421-428.
Sohi et al, "Taste Masking Technologies in Oral Pharmaceuticals: Recent Developments and Approaches," Drug Development and Industrial Pharmacy vol. 30, No. 5, Jan. 1, 2004, pp. 429-448.

* cited by examiner

*Primary Examiner* — Katherine D LeBlanc
(74) *Attorney, Agent, or Firm* — Polsinelli PC

(57) ABSTRACT

The invention relates to substance mixtures which contain (a) sodium carboxymethyl cellulose and (b) at least one bitter principle selected from the group consisting of xanthines, phenolic glycosides, flavanoid glycosides, hydrolysable or non-hydrolysable tannins, flavones and the glycosides thereof, caffeic acid and the esters thereof, terpenoid bitter principles, catechin, epicatechin, epigallocatechin, gallocatechin, gallocatechin-3-gallate, leucine, isoleucine, valine, tryptophan and phenylalanine, protein hydrolysates, peptides and metal salts and their mixtures, and optionally (c) dextrins, with the proviso that the components (a) and (b) are in the weight ratio of from 1:1 to 1:1,000.

11 Claims, No Drawings

SUBSTANCE MIXTURES

FIELD OF THE INVENTION

The invention is in the field of taste masking and relates to substance mixtures composed of cellulose derivatives and bitter principles, foods containing these substance mixtures, processes for the production thereof and use of the cellulose derivatives for masking undesired taste profiles.

STATE OF THE ART

Medicine that is good for the body rarely has a good taste—this simple formula does not only agree with life's experience, it is also a fact that many natural active agents certainly have a positive effect on the human organism but they often taste bitter or astringent.

The most important food additives that have been enjoying a broad application in the past years include branched-chain amino acids which are also referred to as BCAA. They are understood to be the amino acids valine, leucine and isoleucine. They are among the essential amino acids which cannot be formed by the body itself but need to be supplied by way of the food. In contrast to other amino acids, BCAA are almost exclusively metabolised by muscle, thus influencing muscle growth. BCAA are, therefore, predominantly applied in athletic sports and in endurance sports to improve muscle growth and to counteract the tiring of muscles when endurance is required.

Also peptides and protein hydrolysates are found in many food additives, particularly at a high concentration in dietary foods for senior persons in order to support the body's own protein production, preventing extreme muscular dystrophy (sarcopenia) as a result.

However, a particular disadvantage in both cases is that the amino acids—just like the peptides and protein hydrolysates—have a bitter and sometimes metallic taste that has been impossible to mask satisfactorily to this date, which is a reason why many consumers refrain from purchasing them.

For example, international patent application WO 2010 018614 A1 (AJINOMOTO) discloses a preparation with branched amino acids in which an attempt has been made to mask the bitter taste of the mixture by adding particular thickeners and sweeteners.

The same approach is followed by international patent application WO 2013 147451 A1 (SEOUL PHARMA).

Another example is the group of polyphenols, particularly the proanthocyanidins and catechins, which are found in plants that are as different as lichis and green tea, in cranberries and also in grape seeds. The substance groups have been known for a long time for their blood-purifying and antihypertensive effect, and also the liquid/liquid extraction of the actives does not present any particular preparative challenge. However, also in this case it has rarely been possible to add these substances to foods as additives as it has been impossible to mask their unpleasant taste even by adding intensive sweeteners.

U.S. Pat. No. 5,075,114 (MCNEILL) claims chewable medicament tablets, comprising compressed coated granules, wherein the coated granules each comprise a medicament (e.g., Ibuprofen). The coating material consists of a) cellulose acetate and/or cellulose acetate butyrate, and b) hydroxypropyl cellulose.

In this context it is also referred to U.S. Pat. No. 8,003,150 (KRAFT). The document describes the production and application of flavonoids that are blended with glucose, galactose or further reducing sugars. Bitterness and astringency are reduced by adding the sugar to the flavonoids.

The subject matter of US 2006/0159759 A1 (KYOWA) are molded tablets, comprising water-absorbing amino acid granules that are coated with a coating material which is soluble in ethanol, but hardly soluble in water. Among the water-absorbing amino acids there are mentioned proline, lysine, histidine, cysteine, ornithine, glutamic acid and arginine. Shellac and zein are mentioned as suitable coating materials for use in foods, as are ethyl cellulose, methacrylate-copolymer, hydroxypropyl methyl cellulose acetate succinate and hydroxypropyl methyl cellulose phthalate for use in medicaments.

From US 2011/0135786 A1 (HERSHEY) a process for the production of a "ready-to-drink" beverage is known, comprising the following steps: mixing an aqueous preparation of milk and/or milk protein and/or milk protein and a sweetener, a beverage stabiliser and a cocoa product; treating the mixture under ultra-high temperature conditions of ca. 275° to ca. 290° F. from ca. 1 second to ca. 10 seconds; homogenising the mixture; and filling the beverage into a container. Preference is given to the stabilisers as mentioned: cellulose products, particularly micro-crystalline cellulose products.

The subject matter of the Japanese patent application JP 2008 118873 A1 (TAIYO) is enhancing the flavour of beverages with green tea extract by adding highly branched cyclic dextrins.

In addition, Japanese patent application JP 08 298930 A1 describes a process in which a dextrin, cyclodextrin and/or starch, as well as the enzyme cyclomaltodextrin-glucanotransferase is added to a tea extract or to a tea beverage. After the enzyme has taken effect, a reduction of bitterness and astringency is perceivable.

The paper by HOU et al entitled "*Optimization of enzymatic hydrolysis of Alaska pollock frame for preparing protein hydrolysates with low-bitterness*" (LWT-FOOD SCIENCE AND TECHNOLOGY, 44 (2), 2011, pp 421-428) discloses a process for obtaining protein hydrolysates. In doing so, the starting material is initially heated to 120° C. for 30 minutes under high pressure conditions and eventually hydrolysed with a protease. The authors demonstrate that the protease MEAP (Mixed enzymes for animal proteolysis) is the most suitable one for the production of protein hydrolysates from "salmon material" with regard to the bitterness of the finished products.

The subject matter of the paper by PANGBORN et al entitled "*Effect of Hydrocolloids on apparent viscosity and sensory properties of selected beverages*" (JOURNAL OF TEXTURE STUDIES, 9 (4), 1978, pp 415-436) is a study on the influence of five selected hydrocolloids (xanthane, hydroxypropyl cellulose, sodium alginate and sodium carboxyl methyl cellulose of a low and medium viscosity) on the sensory properties of tomato juice, orange juice and instant coffee.

The paper by SOHI et al entitled "*Taste Masking Technologies in Oral Pharmaceuticals: Recent Developments and Approaches*" (DRUG DEVELOPMENT AND INDUSTRIAL PHARMACY, 30 (5), 2004, pp 429-448) provides an overview of the different strategies used by the pharmaceutical industry to mask the bitterness of pharmaceuticals for oral application. A coating with cellulose derivatives (e.g., sodium carboxymethyl cellulose), inter alia, is also reported.

The object of the present invention was, therefore, to provide substance mixtures, comprising bitter principles, particularly branched-chain amino acids, peptids or protein hydrolysates on the one hand, and polyphenols and particularly catechins together with a masking substance on the other, so that the mixtures have a significantly improved, i.e. not a very bitter taste. Further, the object consisted in making the substance mixtures sufficiently water-soluble in order to guarantee an easy incorporation into liquid preparations such as, for example, beverages, particularly instant tea beverages.

DESCRIPTION OF THE INVENTION

The subject matter of the invention is substance mixtures, comprising
(a) sodium carboxymethyl cellulose, and
(b) at least one bitter principle, selected from the group consisting of xanthins, phenolic glycosides, flavanoid glycosides, hydrolysable or non-hydrolysable tannins, flavons and their glycosides, caffeic acid and its esters, terpenoid bitter principles, catechin, epicatechin, epigallocatechin, gallocatechin, gallocatechin-3-gallate, leucine, isoleucine, valine, tryptophan and phenylalanine, protein hydrolysates, peptides and metal salts and their mixtures, and, optionally,
(c) dextrins.
with the proviso that the components (a) and (b) are present in the weight ratio of from 1:1 to 1:1000.

Surprisingly, it was found that with the addition of cellulose derivatives, particularly carboxymethyl celluloses and their salts, the astringent and bitter taste properties of the most diverse bitter principles, particularly of branched-chain amino acids, peptides and protein hydrolysates and also of catechins may not be completely neutralised, but significantly improved. The substance mixtures form complexes or inclusion compounds which, quite unexpectedly, do not precipitate but are water-soluble so that they may be used in various ways. Herein, the invention includes the finding that particularly low-viscosity cellulose derivatives in general and low-viscosity carboxymethyl celluloses in particular show a significantly better effect in comparison with corresponding high-viscosity species when used at equal viscosities.

The addition of dextrins, again, considerably increases the masking effect.

Cellulose Derivatives

Cellulose derivatives that are suitable as component (a) are obtainable, for example, by methylation (methyl cellulose), ethylation, hydroxypropylation, esterification (cellulose esters), sulfonation, nitration (cellulose nitrate), acetylation (cellulose acetate), oxidation, xanthogenation, cross-linking, copolymerisation by branching and the like. The production of derivatives is mostly based on high purity celluloses. During production it is often intended to obtain a narrowly limited degree of polymerisation of the cellulose backbone and a particular substitution pattern of the hydroxyl groups of the cellulose, wherein the substitution pattern is, preferably independent of the chain length, and also uniform along the individual polymer chains.

The mostly preferred cellulose derivatives, however, are carboxymethyl celluloses and their salts, specifically their sodium or potassium salts. These substances are cellulose ethers in which a part of the hydroxyl groups is linked with a carboxymethyl group. For the production of these substances, which are also referred to as "CMC", cellulose is reacted with chloroacetic acid in a superalkaline environment. The carboxymethyl celluloses applicable according to the invention may have degrees of polymerisation (DP) in the range of from ca. 50 to ca. 3,500, molecular weights in the range of from ca. 15 to ca. 700 KDa and Brookfield viscosities of from ca. 15 to 25,000 mPas. Preference is given to CMC, particularly sodium carboxymethyl celluloses with molecular weights of ca. 100 kDa and below, particularly ca. 15 to ca. 90 kDa, having viscosities from 15 to 100 mPas (LVT viscometer, spindle 1, 25° C., 60 rmp) in a 2% by weight aqueous solution. The degree of substitution (DS) may vary between 0.8 and 1.5, wherein products with a low DS in the range of from 0.8 to 1.0 are preferred.

A particularly preferred commercial product is WALOCEL CRT 30 PA (DOW), which is usually used for controlling the rheology of beverages but also as a stabiliser and a protective colloid of proteins.

Bitter Principles

A particular advantage of the present invention is that the cellulose derivatives, specifically the carboxymethyl celluloses are capable of masking the taste of many very different bitter principles. The bitter principles which may be used within the meaning of the present invention include the following groups:

Catechins such as, for example, catechin, epicatechin, epigallocatechingallate (EGCG), gallocatechin, gallocatechin-3-gallate;

Xanthines such as, for example, caffeine, theobromine or theophylline;

Phenolic glycosides such as, for example, quinin, salicin or arbutin;

Flavanoid glycosides such as, for example, neohesperedin, eriocitrin, neoeriocitrin, narirutin, hesperidin or naringin;

Hydrolysable tannins such as, for example, gallic acid esters or ellagic acid esters of carbohydrates and, particularly pentagalloyl glucose;

Non-hydrolysable tannins such as, for example, galloyled catechins or epicatechins and their oligomers, particularly proanthyocyanidine, procyanidins and thearubigenin;

Flavones and their glycosides such as, for example, quercetin, procyanidin B2, procyanidin B5, procyanidin CI, thearubigenin, rutin, taxifolin, myricetin and myrictrin;

Caffeic acid and its esters;

Terpenoid bitter principles such as, for example, limonin, nomilin, lupolone and homulone;

Pharmaceutical agents such as, for example, fluoroquinolone antibiotics, Paracetamol, Aspirin, f3-Lactam antibiotics, Ambroxol, Propylthiouracil [PROP], Guaifenesin;

Amino acids, specifically branched-chain amino acids such as, for example, leucine, isoleucine, valine, tryptophan, proline, histidine, tyrosine, lysine or phenylalanine;

Peptides, particularly those with an amino acid selected from the group consisting of leucine, isoleucine, valine, tryptophan, proline or phenylalanine at the N or C terminus;

Protein hydrolysates with a degree of hydrolysation of from ca. 5 to ca. 50% and, preferably ca. 10 to ca. 35%; and Metal salts such as, for example, potassium chloride, sodium sulfate, magnesium salts, iron salts, aluminium salts and zinc salts.

Among the bitter principles preference is given, on the one hand, to valine, leucine, isoleucine, peptides and protein hydrolysates and catechin, epicatechin, epigallocatechingallate (EGCG), gallocatechin, gallocatechin-3-gallate on the other, as the bitter and astringent taste of these substances is best masked by the cellulose derivatives and here particularly by carboxymethyl celluloses.

Dextrins

As has been demonstrated, the bitter-masking effect of the cellulose derivatives may be further improved by adding dextrins as an optional component (c).

Dextrins or maltodextrins are starch degradation products whose molecule size is between oligosaccharides and starch. Usually, they are present in the form of a white or a light yellow powder. They are mostly obtained from wheat, potato, tapioca or maize starch by dry heating (>150° C.) or under the exposure to acid. In nature, dextrin is, for example, produced by *Bacterium macerans*. Dextrins also develop by way of enzymatic degeneration of starch by amylase. Preference is given to dextrins with 5 to 20, and particularly 6 to 10 dextrose equivalents (DE units). The required quantity of dextrins may be from ca. 100:1 to ca. 1:100, preferably from ca. 50:1 to ca. 1:50, and particularly from ca. 10:1 to ca. 1:10, based on the bitter principles.

Preferred Substance Mixtures

As already explained at the beginning, the combination of cellulose derivatives and branched-chain amino acids, peptides and protein hydrolysates or catechins is a preferred embodiment of the invention, as the effect of taste masking is shown most clearly in this case. Consequently, those substance mixtures are preferred in which the cellulose derivatives represent carboxymethyl celluloses and the bitter principles are selected from the group either consisting of valine, leucine and isoleucine, peptides and protein hydrolysates, or of catechin, epicatechin, epigallocatechingallate (EGCG), gallocatechin, gallocatechin-3-gallate and their mixtures in each case.

As far as branched-chain amino acids are used as bitter principles, the preferred weight ratio of isoleucin:valin:leucin is ca. 1:(1 to 1.2):(2 to 8).

Naturally, there is a lower limit where the cellulose derivatives are not capable of masking the taste profile of the bitter principles any more. This is the case when the quantity of bitter principles predominates. Preferably, components (a) and (b) are present in the weight ratio of from ca. 1:1 to ca. 1:1,000, preferably ca. 1:2 to ca. 1:500, and particularly ca. 1:2 bis 1:50.

Process of Production

The substance mixtures according to the invention may be obtained according to different, but very similar processes:

In a first embodiment, a dry mixture is produced from the bitter principle—for example, an amino acid powder—and the cellulose derivative, optionally together with dextrins, and dissolved in water, wherein a viscosity of from ca. 10 to ca. 2,000 mPas (Brookfield RVT, 20° C., spindle 3) is obtained. An alternative process is to present a beverage, containing the bitter principle such as, for example, a catechin-containing formulation or a product containing amino acids, protein hydrolysates or peptides, dissolving in it the cellulose derivative, optionally together with dextrins.

INDUSTRIAL APPLICABILITY

The substance mixtures obtainable within the meaning of the invention may be added to foods, specifically to food additives and particularly preferably to sports nutrition.

Foods

A further subject matter of the invention thus relates to such foods containing the substance mixtures according to the invention, for example, in quantities of from ca. 0.5 to ca. 10 and preferably ca. 2 to ca. 5% by weight. Typical examples are beverages, specifically lemonades and tea beverages, soy products, dairy products, particularly dairy beverages and yoghurts, and instant powders for the production of beverages.

Food Ingredients

The foods may have further ingredients such as, e.g., sweeteners, food acids, acid regulators, thickeners and particularly aroma substances.

Sweeteners

Suitable sweeteners or sweet tasting additives are, firstly, carbohydrates and specifically sugars such as, for example, sucrose/saccharose, trehalose, lactose, maltose, melizitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde or maltodextrin. Plant-based preparations containing these substances are also suitable, for example, on the basis of sugarbeet (*Beta vulgaris* ssp., sugar fractions, sugar syrup, molasses), sugar cane (*Saccharum officinarum* ssp., molasses, sugar cane syrup), maple syrup (Acer ssp.) or agave (agave syrup).

Suitable are also synthetic, i.e. usually enzymatically produced starch or sugar hydrolysates (invert sugar, fructose syrup);

fruit concentrates (e.g., on the basis of apples or pears);

sugar alcohols (e.g., sorbitol, mannitol, erythritol, threitol, arabitol, ribotol, xylitol, dulcitol, lactitol);

proteins (e.g., miraculin, monellin, thaumatin, curculin, mazzein);

sweeteners (e.g., magap, sodium cyclamate, acesulfam K, neohesperidin dihydrochalcone, saccharine sodium salt, aspartame, superaspartame, neotame, alitame, sucralose, lugduname, carrelame, sucrononate, sucrooctate);

sweet-tasting amino acids (e.g., glycine, D-leucine, D-threonine, D-asparagine, D-phenylalanine, D-tryptophan, L-proline);

further sweet-tasting substances such as, e.g., hernandulcin, dihydrochalcon glycoside, glycyrrhizin, glycerrhetinic acid, their derivatives and salts, stevioside, rebaudioside, monatine, phyllodulcin, mogroside), or plants such as, e.g., *Momordica grosvenori* [Luo Han Guo], *Glycyrrhizza glabra* ssp. [liquorice], *Lippia dulcis, Hydrangea dulcis* or *Stevia* ssp. (e.g., *Stevia rebaudiana*) and the extracts obtained thereof.

Acids and Acidifiers

The foods may contain acids. Acids within the meaning of the invention are preferably acids approved for use in foods, particularly the ones mentioned here:

E260 Acetic acid
E270 Lactic acid
E290 Carbon dioxide
E296 Malic acid
E297 Fumaric acid
E330 Citric acid
E331 Sodium citrates
E332 Potassium citrates
E333 Calcium citrates
E334 Tartaric acid
E335 Sodium tartrates
E336 Potassium tartrates
E337 Sodium potassium
E338 Phosphoric acid
E353 Metatartaric acid
E354 Calcium tartrate
E355 Adipic acid
E363 Succinic acid
E380 Triammonium citrate E513 Sulphuric acid
E574 Gluconic acid
E575 Glucono delta-lactone Acidity Regulators Acidity regulators are food additives which maintain the degree of acidity or alkalinity and, thus, the desired pH value of a food on a constant level. They are mostly organic acids and their salts, carbonates, and only rarely inorganic acids and their salts. The addition of an acidity regulator partly enhances the stability and firmness of the food and improves the effect of preservatives. In contrast to acidifiers, they are not used to change the taste of foods. Their effect is based on the formation of a buffer system within the food, which is capable of balancing acids and bases such that the pH value is not, or only slightly, changed. Examples are:
E 170—Calcium carbonate
E 260-263—Acidic acid and acetates
E270—Lactic acid
E 296—Malic acid
E 297—Fumaric acid
E 325-327—Lactates (Lactic acid)
E 330-333—Citric acid and citrates
E 334-337—Tartaric acid and tartrates
E 339-341—Orthophosphate
E 350-352—Malates (Malic acid)
E 450-452—Di-, Tri- and Polyphosphates
E 500-504—Carbonates (Carbonic acid)
E 507—Hydrochloric acid and chlorides
E 513-517—Sulphuric acid and sulphates
E 524-528—Hydroxides
E 529-530—Oxides
E 355-357—Adipic acid and adipates
E 574-578—Gluconic acid and gluconates Thickeners Thickeners which are also referred to as thickening agents or binders are mostly obtained from plants and algae. They are also referred to as hydrocolloids which are understood to be a group of polysaccharides that are dissolvable in water and possess a high ability to form gels. Due to their ability to bind water, thickeners are mostly added to aqueous solutions to improve their viscosity. Further, they are intended to structure the food, thus influencing the mouthfeel or a particular chewing impression when eaten. Most thickeners are linear or branched makromolecules (e.g., polysaccharides or proteins) which may interact by way of intermolecular interactions such as hydrogen bonds, hydrophobic interactions or ionic relationships. Examples are:
E400—Alginic acid
E401—Sodium alginate
E402—Potassium alginate
E403—Ammonium alginate
E404—Calcium alginate
E405—Propylene glycol alginate
E406—Agar
E407—Carrageenan, Furcellaran
E410—Locust bean gum
E412—Guar gum
E413—Tragacanth
E414—Gum arabic
E415—Xanthan gum
E416—Karaya gum (Indian Gum Tragacanth)
E417—Tara gum (Peruvian locust bean gum)
E418—Gellan gum
E440—Pectins, Opekta
E 440ii—Amidated pectin
E460—Mikrocrystalline cellulose, cellulose powder
E461—Methyl cellulose
E462—Ethyl cellulose
E463—Hydroxypropyl cellulose
E465—Ethyl methyl cellulose
E466—Carboxymethyl cellulose, sodium carboxymethyl cellulose Taste-Influencing Substances
Aroma Substances.

The oral preparations according to the invention may contain one or more aroma substances. Typical examples comprise: acetophenone, allyl caproate, alpha-ionone, beta-ionone, aniseed aldehyde, anisyl acetate, anisyl formate, benzaldehyde, benzothiazole, benzyl acetate, benzyl alcohol, benzyl benzoate, beta-ionone, butyl butyrate, butyl capronate, butylidene phthalide, carvone, camphene, caryophyllene, cineol, cinnamyl acetate, citral, citronellol, citronellal, citronellyl acetate, cyclohexyl acetate, cymol, damascone, decalactone, dihydrocoumarin, dimethyl anthranilate, dimethyl anthranilate, dodecalactone, ethoxy ethyl acetate, ethylbutyric acid, ethyl butyrate, ethyl caprinate, ethyl capronate, ethyl crotonate, ethyl furaneol, ethylguaiakol, ethyl isobutyrate, ethyl isovalerianate, ethyl lactate, ethylmethyl butyrate, ethyl propionate, eucalyptol, eugenol, eugenyl acetate, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g., 5 Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl capronate, trans-2-hexenyl capronate, cis-3-hexenyl formiate, cis-2-hexyl acetate, cis-3-hexyl acetate, trans-2-hexyl acetate, cis-3-hexyl formiate, para-hydroxybenzyl acetone, isoamyl alcohol, isoamyl isovalerianate, isobutyl butyrate, isobutyl aldehyde, isoeugenol methyl ether, isopropyl methyl thiazole, lauric acid, levulinic acid, linalool, linalool oxide, linalyl acetate, menthol, menthofuran, methyl anthranilate, methyl butanol, methyl butyric acid, 2-methyl butyl acetate, methyl capronate, methyl cinnamate, 5-methyl furfural, 3,2,2-methyl cyclopentenolone, 6,5,2-methyl heptenone, methyl dihydrojasmonate, methyljasmonate, 2-methyl methylbutyrate, 2-methyl-2-pentanoic acid, methyl thiobutyrate, 3,1-methyl thiohexanol, 3-methyl thiohexyl acetate, nerol, neryl acetate, trans,trans-2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentandione, phenylethyl acetate, phenylethyl alcohol, phenylethyl alcohol, phenylethyl isovalerianate, piperonal, propionaldehyde, propyl butyrate, pulegon, pulegol, sinensal, sulfurol, terpinene, terpineol, terpinolene, 8,3-thiomenthanone, 4,4,2-thiomethyl pentanone, thymol, delta-undecalactone, gamma-undecalactone, valencene, valeric acid, vanilline, acetoine, ethyl vanilline, ethyl vanilline isobutyrate (=3-ethoxy-4-isobutyryloxybenzaldehyde), 2,5-dimethyl-4-hydroxy-3(2H)-furanone and derivatives (here, preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here, preferably ethyl maltol), coumarine and coumarine derivatives, gamma-lactones (here, preferably gamma-undecalactone, gamma-nonalactone, gamma-decalactone), delta-lactones (here, preferably 4-methyldeltadecalactone, massoilactone, delta-decalactone, tubero lactone), methyl sorbate, divanilline, 4-hydroxy-2(or 5)-ethyl-5(or 2)-methyl-3(2H)furanone, 2-hydroxy-3-methyl-2-cyclopentenon, 3-hydroxy-4,5-dimethyl- 2(5H)-furanone, isoamyl acetate, ethyl butyrate, butyl butyrate, isoamyl butyrate, methyl-3-ethyl butyrate, n-hexanoic acid allyl ester, n-hexanoic acid-n-butyl ester, n-ethyl octanoate, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furane, 2-methyl-3-furanthiol, bis(2-methyl-3-furyl)disulfide, furfuryl mercaptane, methional, 2-acetyl-2-thiazoline, 3-mercapto-2-pentanone, 2,5-dimethyl-3-furanthiol, 2,4,5-trimethylthiazol, 2-acetylthiazol, 2,4-dimethyl-5-ethylthiazol, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-Isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-Penten-3-one, 4-hydroxy-2,5-dimethyl-3(2H)-furanone, guaiakol, 3-hydroxy-4,5-dimethyl-2(5H)-furanone, 3-hydroxy-4-methyl-5-ethyl-2 (5H)-furanone, cinnamon aldehyde, cinnamon alcohol, methyl salicylate, isopulegol and (not explicitly mentioned here) stereoisomers, enantiomers, positional isomers, diastereomers, cis/trans-isomers and epimers of these substances.

Taste Modulators.

These preparations—similar to the aroma mixtures—may further contain additional aroma substances for influencing or modulating a salty, optionally, slightly sour and/or umami taste impression. Thus, the products according to the invention or aroma mixtures are used in combination with at least one further substance that is suitable for the enhancement of a pleasant taste impression (salty, umami, optionally, slightly sour). Herein, salty tasting compounds and salt-enhancing compounds are preferred. Preferred compounds are disclosed in WO 2007/045566. Preference is also given to umami compounds as described in WO 2008/046895 and EP 1 989 944.

Preferred aroma substances are those which cause an olfactory impression that is associated with a sweet taste, wherein the substance(s) is or are preferably selected from the group consisting of Vanillin, ethyl vanillin, ethyl vanillin isobutyrate (=3-ethoxy-4-isobutyryloxybenzaldehyde), Furaneol® (2,5-dimethyl-4-hydroxy-3(2H)-furanone) and derivatives (e.g., homofuraneol, 2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3(2H)-furanone), maltol and maltol derivatives (for example ethylmaltol), coumarin and derivatives, gamma-lactones (for example gamma-undecalactone, gamma-nonalactone), delta-lactones (for example 4-methyl delta-lactone, massoilactone, delta-decalactone, tuberolactone), methyl sorbate, divanilline, 4-hydroxy-2(or 5)-ethyl-5(or 2)-methyl-3(2H)-furanone, 2-hydroxy-3-methyl-2-cyclopentenones, 3-hydroxy-4,5-dimethyl-2(5H)-furanone, fruit esters and fruit lactones (for example acetic acid n-butyl ester, acetic acid isoamyl ester, propionic acid ethyl ester, butyric acid ethyl ester, butyric acid n-butyl ester, butyric acid isoamyl ester, 3-methylbutyric acid ethyl ester, n-ethyl hexanoate n-allyl hexanoate, n-hexanoic acid n-butyl ester, n-octanoic acid ethyl ester, ethyl-3-methyl-3-phenyl glycidate, ethyl-2-trans-4-cis-decadienoate), 4-(p-hydroxyphenyl)-2-butanone, 1,1-dimethoxy-2,2,5-trimethyl-4-hexane, 2,6-dimethyl-5-hepten-1-al, 4-hydroxycinnamic acid, 4-methoxy-3-hydroxycinnamic acid, 3-methoxy-4-hydroxycinnamic acid, 2-hydroxycinnamic acid, 2,4-dihydroxybenzoic acid, 3-hydroxybenzoic acid, 3,4-dihydroxybenzoic acid, vanillic acid, homovanillic acid, vanillylmandelic acid and phenylacetaldehyde.

Active Agents for Masking Unpleasant Flavour Impressions.

The oral preparations may further comprise additional substances which also serve to mask bitter and/or astringent taste impressions. These further taste correctors are, e.g., selected from the following list: nucleotides (e.g., adenosine-5'-monophosphate, cytidine-5'-monophosphate) or their salts, lactisoles, sodium salts (e.g., sodium chloride, sodium lactate, sodium nitrate, sodium acetate, sodium gluconate), hydroxyflavanones, here, preferably eriodictyol, sterubin (eriodictyol-7-methyl ether), homoeriodictyol, and their sodium, potassium, calcium, magnesium or zinc salts (particularly those as described in EP 1258200 A2, which is incorporated into this application by way of reference with regard to the corresponding compounds disclosed therein), hydroxybenzoic acid amides, such as e.g. 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-(4-hydroxy-3-methoxybenzyl)amide, 4-hydroxybenzoic acid N-(4-hydroxy-3-methoxybenzyl) amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl) amide, 2,4-dihydroxybenzoic acid N-(3,4-dihydroxybenzyl) amide or 2-hydroxy-5-methoxy-N-[2-(4-hydroxy-3-methoxyphenyl)ethyl]amide; 4-hydroxybenzoic acid vanillylamide (particularly those as described in WO 2006/024587, which is incorporated into this application by way of reference with regard to the corresponding compounds disclosed therein); hydroxydeoxybenzoins, such as e.g. 2-(4-hydroxy-3-methoxyphenyl)-1-(2,4,6-trihydroxyphenyl) ethanone, 1-(2,4-dihydroxyphenyl)-2-(4-hydroxy-3-methoxyphenyl)ethanone and 1-(2-hydroxy-4-methoxyphenyl)-2-(4-hydroxy-3-methoxyphenyl)ethanone (particularly those as described in WO 2006/106023, which is incorporated into this application by way of reference with regard to the corresponding compounds disclosed therein); hydroxyphenyl alkanediones such as e.g. gingerdione-[2], gingerdione-[3], gingerdione-[4], dehydrogingerdione-[2], dehydrogingerdione-[3] or dehydrogingerdione-[4] (particularly those as described in WO 2007/003527, which is incorporated into this application by way of reference with regard to the corresponding compounds disclosed therein); diacetyl trimers (particularly those as described in WO 2006/058893, which is incorporated into this application by way of reference with regard to the corresponding compounds disclosed therein); gamma-aminobutyric acids (particularly those as described in WO 2005/096841, which is incorporated into this application by way of reference with regard to the corresponding compounds disclosed therein); divanillins (particularly those as described in WO 2004/078302 which is incorporated into this application by way of reference with regard to the corresponding compounds disclosed therein) and 4-hydroxydihydrochalcones (preferably as described in US 2008/0227867 A1 which is incorporated into this application by way of reference with regard to the corresponding compounds disclosed therein), here, particularly phloretin and davidigenin, amino acids or mixtures of whey proteins with lecithins, hesperetin as disclosed in WO 2007/014879 which is incorporated into this application by way of reference with regard to the corresponding compounds disclosed therein), 4-hydroxydihydrochalcones as disclosed in WO 2007/107596, which is incorporated into this application by way of reference with regard to the corresponding compounds disclosed therein), or propenyiphenylglycosides (chavicolglycosides) as described in EP 1955601 A1, which is incorporated into this application by way of reference with regard to the corresponding compounds disclosed therein, or extracts from *Rubus suavissimus*, extracts from *Hydrangea macrophylla* as described in EP 2298084 A1, pellitorin and derived aroma compositions as described in EP 2008530 A1, umami compounds as described in WO 2008/046895 A1 and EP 1989944 A1, umami compounds as described in EP 2064959 A1 or EP 2135516 A1, vanillyl lignans, enterodiol, and N-decadienoyl amino acids and their mixtures.

Vitamins

In a further embodiment of the present invention the food additives may contain vitamins as a further optional group of additives. Vitamins have the most diverse biochemical modes of action. Some act similarly to hormones and regulate the mineral metabolism (e.g., vitamin D), or act on the growth of cells and of tissue and on the cell differentiation (e.g., some forms of vitamin A). Others represent antioxidants (e.g., vitamin E and, under certain conditions, also vitamin C). The largest number of vitamins (e.g., the B vitamins) represent preliminary stages for enzymatic cofactors which support the enzymes in catalyzing certain processes during metabolism. In this context, vitamins can sometimes be closely bound to the enzymes, for example, as a part of the prosthetic group: one example thereof is biotin which forms a part of the enzyme that is responsible for the construction of fatty acids. Vitamins, on the other hand, can also be bound much less strongly, acting as co-catalysts, for example, groups which are easily separable and are transporting chemical groups or electrons between the molecules. For example, folic acid transports methyl-, formyl- and methylene groups into the cell. Although their support of the enzyme-substrate reactions is well known, also their other properties are of a great significance for the body.

Within the present invention, substances suitable as vitamins are contemplated which are selected from the group consisting of:

Vitamin A (retinol, retinal, beta-carotene),
Vitamin B₁ (thiamin),
Vitamin $B_2$ (riboflavin),
Vitamin $B_3$ (niacin, niacinamide),
Vitamin $B_5$ (panthothenic acid),
Vitamin $B_6$ (pyridoxine, pyridoxamine, pyridoxal),
Vitamin $B_7$ (biotin),
Vitamin $B_9$ (folic acid, folinic acid),
Vitamin $B_{12}$ (cyanobalamin, hydroxycobalamin, methylcobalamin),
Vitamin C (ascorbic acid),
Vitamin D (cholecalciferol),
Vitamin E (tocopherol, tocotrienol) and
Vitamin K (phyllolqinone, menaquinone).

Besides ascorbic acid, the preferred vitamins are the group of tocopherols.

Prebiotic Substances

In a further embodiment of the invention, the preparations may contain prebiotic substances (prebiotics). Prebiotics are defined as indigestible food components which when ingested stimulate the growth or the activity of a range of useful bacteria in the large bowel. The addition of prebiotic compounds improves the stability of the anthocyanins with regard to degradation processes in the intestinal tract. In the following, various substances, particularly carbohydrates, are listed, which are particularly preferred as prebiotics within the meaning of the present invention.

Fructooligosaccharides.

Fructooligosaccharides, abbreviated as FOS, particularly comprise short-chain representatives with 3 to 5 carbon atoms such as, for example, D-fructose and D-glucose. FOS, also referred to as neosugars, are commercially produced on the basis of saccharose and the enzyme fructosyltransferase which is obtained from fungi. FOS particularly support the growth of bifidobacteria in the intestine and are marketed together with probiotic bacteria in various functionalised foods, predominantly in the USA.

Inulins.

Inulins are included in a group of naturally occurring oligosaccharides that contain fructose. They belong to a class of carbohydrates referred to as fructans. They are obtained from the roots of the chicory plant (*Cichorium intybus*) or the so-called jerusalem artichokes. Inulins mostly consist of fructose units typically having a glucose unit as an end group. Here, the fructose units are linked to one another via a beta-(2-l)glycosidic bond. The average degree of polymerisation of inulins which are used as prebiotics in the field of nutrition is from 10 to 12. Inulins also stimulate the growth of bifidobacteria in the large bowel.

Isomaltooligosaccharides.

This group is a blend of alpha-D-linked glucose oligomers, including isomaltose, panose, isomaltotetraose, isomaltopentaose, nigerose, kojibiose, isopanose and higher branched oligosaccharides. Isomaltooligosaccharides are produced by means of various enzymatic processes. They also stimulate the growth of bifidobacteria and of lactobacillae in the large bowel. Isomaltooligosaccharides are specifically used as food additives in functionalised foods in Japan. In the meantime, they are also distributed in the USA.

Lactilol.

Lactilol is the disaccharide of lactulose. It is medically used against constipation and against hepatic encephalopathy. In Japan, lactilol is used as prebiotic. It is resistant against degradation in the upper gastrointestinal tract, but is fermented by various intestinal bacteria, which leads to an increase in the biomass of bifidobacteria and lactobacillae in the intestine. Lactilol is also known under the chemical designation 4-O-(beta-D-galactopyranosyl)-D-glucitol. The medical range of application of lactilol is restricted in the USA due to a lack of studies; in Europe it is preferably used as a sweetener.

Lactosucrose.

Lactosucrose is a trisaccharide composed of D-galactose, D-glucose and D-fructose. Lactosucrose is produced by means of the enzymatic transfer of the galactosyl moiety from lactose to sucrose. It is neither degraded in the stomach nor in the upper part of the intestinal tract and is exclusively consumed by bifidobacteriae for growth. Under physiological aspects, lactosucrose acts as a stimulant for the growth of intestinal flora. Lactosucrose is also known as 4G-beta-D-galactosucrose. In Japan it is widespread as food additive and as a component of functionalised foods, particularly also as an additive for yoghurts. Lactosucrose is currently tested for a similar purpose of application also in the USA.

Lactulose.

Lactulose is a semisynthetic disaccharide composed of D-lactose and D-fructose. The sugars are linked via a beta-glycosidic bond which makes them resistant against hydrolysis by digestive enzymes. Instead, lactulose is fermented by a limited number of intestinal bacteria, which leads to the growth of lactobacillae and bifidobacteria in particular. In the USA, lactulose is a prescription medicament against constipation and hepatic enzephalopathy. In Japan, in contrast, it is freely sold as a food additive and a component of functionalised foods.

Pyrodextrins.

Pyrodextrins comprise a blend of glucose-containing oligosaccharides which are formed during the hydrolysis of starch. Pyrodextrins enhance the proliferation of bifidobacteria in the large bowel. They are also not degraded in the upper intestinal region.

Soy oligosaccharides.

This group belongs to the oligosaccharides that are substantially found in soy beans and in other beans and peas only. The two decisive representatives are the trisaccharide raffinose and the tetrasaccharide stachyose. Raffinose is composed of one molecule D-galactose, D-glucose and D-fructose each. Stachyose consists of two molecules D-galactose and one molecule D-glucose and D-fructose each. Soy oligosaccharides stimulate the growth of bifidobacteria in the large bowel and are already used in Japan as food additives and in functionalised foods. They are currently tested in the USA for this application.

Trans-galactooligosaccharides.

Trans-galactooligosaccharides (TOS) represent blends of oligosaccharides on the basis of D-glucose and D-galactose. Supported by the enzyme betaglucosidase, TOS are produced from *Aspergillus oryzae* on the basis of D-lactose. Like many other prebiotics, also TOS are stable in the small bowel, stimulating the growth of bifidobacteria in the large bowel. TOS are marketed in Europe and in Japan as food additives.

Xylooligosaccharides.

Xylooligosaccharides contain beta-1,4-linked xylose units. The degree of polymerisation of the xylooligosaccharides is between 2 and 4. They are obtained from the polysaccharide xylan by enzymatic hydrolysis. They are already marketed in Japan as food additives, in the USA they are still in the testing phase.

Biopolymers.

Suitable biopolymers which are also suitable as prebiotics such as, for example, beta-glucans, are characterised in that they are produced on a plant basis, for example, from cereals such as oat and barley, but also fungi, yeasts and bacteria are suitable sources of raw material. In addition, microbially produced cell wall suspensions or whole cells with a high beta glucane content are suitable. Residual portions of the monomers have 1-3 and 1-4 or 1-3 and 1-6 bonds, as a result of which the content may vary strongly. Preferably, beta-glucans are obtained on the basis of yeasts, particularly *Saccharomyces*, specifically *Saccharomyces cerevisiae*. Other suitable biopolymers are chitin and chitin derivatives, particularly oligoglucosamin and chitosan, which is a typical hydrocolloid.

Galacto-oligosaccharides (GOS).

Galacto-oligosaccharides are produced through the enzymatic transformation of lactose, a component of bovine milk.

GOS generally comprise a chain of galactose units that arise through consecutive transgalactosylation reactions, with a terminal glucose unit. Terminal glucose units are mostly formed by an early hydrolysis of GOS. The degree of polymerisation of GOS can vary quite markedly, ranging from 2 to 8 monomeric units. Here, a number of factors determines the composition and the sequence of the monomer units: the source of the enzyme, the starting material (source and concentration of the lactose), the enzymes involved in the process, the conditions during processing, and the composition of the medium.

Probiotic Microorganisms

Probiotic microorganisms, also referred to as probiotics, are living microorganisms which have beneficial properties for the host. According to the definition by FAO/WHO, they are "living microorganisms which beneficially affect the host when suitably administered". Lactic acid bacteriae (LAB) and bifidobacteria are the most well-known probiotics; however, also various yeasts and bacillae may be used. Probiotics are usually incorporated as a component of fermented foods such as, e.g., yoghurt, soy yoghurt or other probiotic foods to which specific living cultures have been added. In addition, also tablets, capsules, powders and sachets are available, which contain the microorganisms in a freeze-dried form. Table A provides an overview of commercially available probiotics and the pertaining claims on health effects, which may be employed within the meaning of the present invention.

TABLE A

| Probiotic substances | | | |
|---|---|---|---|
| Strains | Name | Producer | Claim on health effect |
| *Bacillus coagulans* GBI-30, 6086 | GanedenBC | Ganeden Biotech | Increases the immune response to viral infections |
| *Bifidobacterium animalis* subsp. *lactis* BB-12 | Probio-Tec *Bifidobacterium* BB-12 | Chr. Hansen | Clinical studies on humans showed that BB-12 positively influences the gastrotestinal system. |
| *Bifidobacterium infantis* 35624 | Align | Procter & Gamble | A preliminary study showed that the bacterium may reduce abdominal pain. |
| *Lactobacillus acidophilus* NCFM | | Danisco | A study reveals the reduction of side effects of antibiotic treatments. |
| *Lactobacillus paracasei* St11 (or NCC2461) | | | |
| *Lactobacillus johnso-nii* La1 (=*Lactobacillus* LC1, *Lactobacillus john-sonii* (NCC533) | | Nestle | Reduces symptoms of gastritis and reduces inflammations |
| *Lactobacillus plantarum* 299v | GoodBelly/ Pro-Viva/ ProbiMage | Probi | Might improve IBS symptoms; however, more studies are required. |

TABLE A-continued

Probiotic substances

| Strains | Name | Producer | Claim on health effect |
|---|---|---|---|
| *Lactobacillus reuteri* American Type CultureCollection\ATTC 55730 *Lactobacillus reuteri* SD2112) *Lactobacillus reuteri* Protectis (DSM 17938, daughter strain of ATCC 55730) *Lactobacillus reuteri* Protectis (DSM 17938, daughter strain of ATCC 55730) | | BioGaia | First signs of effectiveness against gingivitis, fever in children, and reduction of sick days in adults. |
| *Saccharomyces boulardii* | DiarSafe and others | Wren Laboratories | Reduced evidence in treatment of acute diarrhea conditions. |
| *Lactobacillus rhamnosus* GR-1 & *Lactobacillus reuteri* RC-14 | Bion Flore Intime/Jarrow Fem-Dophilus | Chr. Hansen | Evidence of effectiveness against vaginitis in one study. |
| *Lactobacillus acidophilus* NCFM & *Bifidobacterium bifidum* BB-12 | Florajen3 | American Lifeline, Inc. | First signs of effectiveness against CDAD |
| *Lactobacillus acidophilus* CL1285 & *Lactobacillus casei* LBC80R | Bio-K+ CL1285 | Bio-K+ International | Signs of improvement of digestion specifically with regard to lactose intolerance. |
| *Lactobacillus planta-rum* HEAL9 & *Lactobacillus paracasei* 8700:2 | Bravo Friscus/ProbiFrisk | Probi | Currently, studies are performed on the effectiveness against colds. |

Two further forms of lactic acid bacteria are stated in the following, which may also be used as probiotics:

*Lactobacillus bulgaricus;*
Streptococcus thermophilus;
Antioxidants

In food industry, both natural and also synthetic antioxidants are used. Natural and synthetic antioxidants primarily differ in that the former are naturally occurring in food, and the latter are produced synthetically. For example, natural antioxidants, when used as food additive, are obtained from vegetable oils. Vitamin E, also known as tocopherol, is frequently obtained from soybean oil, for example. In contrast, synthetic antioxidants such as propyl gallate, octyl gallate and dodecyl gallate are obtained by chemical synthesis. Gallates may trigger allergies in sensitive people. Further employable antioxidants in compositions of the present invention are: sulphur dioxide (E 220), sodium sulphite (E 221), sodium hydrogen sulphite (E 222), sodium metabisulphite (E 223), potassium metabisulphite (E 224), calcium sulphite (E 226), calcium hydrogen sulphite (E 227), potassium hydrogen sulphite (E 228), lactic acid (E 270), ascorbic acid (E 300), sodium-L-ascorbate (E 301), calcium-L-ascorbate (E 302), Fatty acid esters of ascorbic acid (E 304), tocopherol (E 306), alpha-tocopherol (E 307), gamma-tocopherol (E 308), delta-tocopherol (E 309), propyl gallate (E 310), octyl gallate (E 311), dodecyl gallate (E 312), erythorbic acid (E 315), sodium erythorbate (E 316), tertiary-butyl hydroquinone (TBHQ) (E 319), butylated hydroxyanisole (E 320), butylated hydroxytoluene (E 321), lecithins (E 322), citric acid (E 330), sodium and potassium citrates (E 331 & E 332), sodium citrate (E 331), potassium citrate (E 332), calcium disodium ethylene diamine tetraacetate; calcium disodium EDTA (E 385), diphosphates (E 450), disodium diphosphate (E 450a), trisodium diphosphate (E 450b), tetra sodiumdiphosphate (E 450c), dipotassium diphosphate (E 450d), tripotassium diphosphate (E 450e), dicalciumdiphosphate (E 450f), potassium dihydrogen diphosphate (E 450g), triphosphates (E 451), pentasodium triphosphate (E 451a), pentapotassium triphosphate (E 451b), polyphosphates (E 452), sodium polyphosphate (E 452a), potassium polyphosphate (E 452b), sodium calcium polyphosphate (E 452c), potassium polyphosphate (E 452d), stannuous chloride (E 512).

Emulsifiers

Emulsifiers are characterised by the significant property to be soluble both in water and in fat. Emulsifiers are mostly composed of a fat-soluble and a water-soluble part. They are always used when water and oil are to form a consistent, homogeneous mixture.

Suitable emulsifiers used in the food-processing industry are selected from: ascorbyl palmitate (E 304), lecithins (E 322), phosphoric acid (E 338), sodium phosphate (E 339), potassium phosphate (E 340), calcium phosphate (E 341), magnesium phosphates (E 343), propane-1,2-diol alginate (E405), polyoxyethylene(8)stearate (E 430), polyoxyethylene stearate (E 431), ammonium phosphatides (E 442), sodium phosphate and potassium phosphate (E 450), Sodium, potassium and calcium salts of fatty acids (E 470 a), mono- and diglycerides of fatty acids (E 471), Acetic acid esters of monoglycerides of fatty acids (E 472a), lactic acid esters of monoglycerides of fatty acids (E 472 b), citric acid esters of monoglycerides of fatty acids (E 472c), tartaric acid esters of monoglycerides of fatty acids (E 472 d), Diacetyl-tartaric acid esters of monoglycerides of fatty acids (E 472e), sucrose esters of fatty acids (E 473), sucroglycerides (E 474), polyglycerol esters of fatty acids (E 475), polyglycerol polyricinoleate (E 476), Propane-1,2-diol esters of fatty acids (E 477), sodium stearoyl-2-lactylate (E 481), calcium stearoyl-2-lactylate (E 482), stearyl tartrate (E483), sorbitan monostearate (E 491), stearic acid (E 570).

Food Colours

Food colours or, shortly, colours are food additives for colouring foods. Colours are classified into the groups of natural colours and synthetic colours. The nature-identical colours are also of synthetic origin. The nature-identical colours are synthetic reproductions of colouring substances that occur in nature. Suitable colours for use in the present composition are selected from: Curcumin (E 100), Riboflavin, Lactoflavin, Vitamin B2 (E 101), Tartrazin (E 102), Quinoline Yellow (E 104), orange yellow S, sunset yellow RGL (E 110), Cochineal, Carminic acid, Carmines (E 120), Azorubine, Carmoisine (E 122), Amaranth (E 123), Cochineal Red A, Ponceau 4 R, Brilliant Scarlet 4 R (E 124), Erythrosine (E 127), Allura Red AC (E 129), Patent Blue V (E 131), Indigotine, Indigo Carmine (E 132), Brilliant Blue FCF, Patent Blue AE, Amido Blue AE (E 133), Chlorophylls, Chlorophyllins (E 140), Copper complexes of chlorophyll and chlorophyllins (E 141), Acid Green, Green S (E 142), Plain caramel (E 150 a), Caustic sulphite caramel (E 150 b), Ammonia caramel (E 150 c), Sulphite ammonia caramel (E 150 d), Brilliant black FCF, Brilliant black PN, Black PN (E 151), Vegetable carbon (E 153), Brown FK (E 154), Brown HT (E 155), Carotenes (E 160 a), Annatto, Bixin, Norbixin (E 160 b), Capsanthian, Capsorubin (E 160 c), Lycopene (E 160 d), Beta-apo-8'-Carotenal (C30), Apocarotenal, Beta-Apocarotenal (E 160 e), Apocarotenal ester, Beta-Carotenal acid ester (E 160 f), Lutein, Xanthophyll (E 161 b), Canthaxanthin (E 161 g), Betanin, Beetroot Red (E 162), Anthocyanins (E 163), Calcium carbonate (E 170), Titanium dioxide (E 171), Iron oxides and hydroxides (E 172), Aluminium (E 173), Silver (E 174), Gold (E 175), Litholrubine BK, Rubin pigment BK (E 180).

Further subject matters of the present invention relate, on the one hand, to the
use of sodium carboxymethyl cellulose for masking the bitter taste of bitter principles selected from the group consisting of xanthines, phenolic glycosides, flavanoid glycosides, hydrolysable or non-hydrolysable tannins, flavons and their glycosides, caffeic acid and its esters, terpenoid bitter principles, catechin, epicatechin, epigallocatechin, gallocatechin, gallocatechin-3-gallate, leucine, isoleucine, valine, tryptophan and phenylalanine, protein hydrolysates, peptides and metal salts and their mixtures, and on the other, to the
use of cellulose derivatives together with dextrins for masking the bitter taste of bitter principles selected from the group consisting of xanthines, phenolic glycosides, flavanoid glycosides, hydrolysable or non-hydrolysable tannins, flavons and their glycosides, caffeic acid and its esters, terpenoid bitter principles, catechin, epicatechin, epigallocatechin, gallocatechin, gallocatechin-3-gallate, leucine, isoleucine, valine, tryptophan and phenylalanine, protein hydrolysates, peptides and metal salts and their mixtures.

Examples

Examples 1 to 7 Comparison Example VI

An amino acid preparation consisting of leucine, valine and isoleucine in the ratio of 1.8:1.2:1 was dissolved in water to obtain a consumable product (V1). For the production of further preparations, the amino acid mixture consisting of leucine, valine and isoleucine was each mixed with cellulose derivatives of different degrees of polymerisation and, optionally, with dextrins with different dextrose equivalents, acidifiers and sweeteners in the ratio of 1.8:1.2:1. These preparations were dissolved in water, like V1, to obtain consumable products (1-7). The quantities of dissolved amino acids and the viscosities are identical in the consumable products V1 or 1-7. The solutions were then evaluated for their taste by a panel consisting of 5 experienced testers. In this process, the bitterness was evaluated using the following scale: scale of 0 (no impression) to 10 (very strong impression). The composition of the consumable products and their evaluation (average value of 5 testers and triple assessment) are reflected in Table 1.

TABLE 1

Composition of the consumable products and taste evaluation (indications in % by weight)

| Component | V1 | 1 | 2 | 3 | 4 | 5 | 6 | 7 |
|---|---|---|---|---|---|---|---|---|
| L-Leucine | 0.9 | 0.9 | 0.9 | 0.9 | 0.9 | 0.9 | 0.9 | 0.9 |
| L-Valine | 0.6 | 0.6 | 0.6 | 0.6 | 0.6 | 0.6 | 0.6 | 0.6 |
| L-Isoleucine | 0.5 | 0.5 | 0.5 | 0.5 | 0.5 | 0.5 | 0.5 | 0.5 |
| CMC1 | | 0.4 | | 0.4 | 0.4 | 0.4 | 0.4 | 0.4 |
| CMC2 | | | 0.05 | | | | | |
| Maltodextrin DE | | | | 1 | | 1 | | 1 |
| Maltodextrin DE6 | | | | | | | 5 | |
| Symrise masking | | | | | 0.2 | 0.2 | 0.2 | 0.2 |
| Citric acid | | | | | | | | 0.1 |
| Sucralose | | | | | 0.01 | | | 0.007 |
| Water | | | | Ad 100 | | | | |
| Evaluation of the | 8.0 | 6.0 | 7.5 | 5.5 | 4.8 | 5.1 | 5.0 | 4.1 |

1) WALOCEL CRT 30 PA
2) WALOCEL CRT 10,000 GA

The examples clearly show that the bitter taste of the amino acid mixture is reduced by addition of low-viscosity cellulose derivatives. Effectiveness may be enhanced when combined with dextrins.

The invention claimed is:

1. A substance mixture comprising:
   (a) sodium carboxymethyl cellulose having a molecular weight of from 15 to 90 kDa;
   (b) a bitter principle selected from leucine, valine, isoleucine, or a mixture thereof; and
   (c) optionally, a dextrin;
   provided that components (a) and (b) are present in a weight ratio of from 1:2 to 1:50 ((a):(b)), and the sodium carboxymethyl cellulose provides a viscosity of 15 mPas to 100 mPas in a 2 wt. % aqueous solution at 25° C.; and
   further provided that that the sodium carboxymethyl cellulose of (a) masks bitterness of the bitter principle of (b).

2. The substance mixture according to claim 1 comprising the dextrin of component (c) and the dextrin has a DE value of from 5-20.

3. The substance mixture according to claim 1, further comprising:
(d) a taste-influencing substance.

4. The substance mixture according to claim 1 comprising:
(a) sodium carboxymethyl cellulose having a molecular weight of from 15 to 90 kDa;
(b) a bitter principle selected from leucine, valine, isoleucine, or a mixture thereof;
(c) a dextrin having a DE value of from 5-20; and
(d) a taste-influencing substance;
provided that components (a) and (b) are present in a weight ratio of from 1:2 to 1:50 ((a):(b)), and the sodium carboxymethyl cellulose provides a viscosity of 15 mPas to 100 mPas in a 2 wt. % aqueous solution at 25° C.; and
further provided that that the sodium carboxymethyl cellulose of (a) masks bitterness of the bitter principle of (b).

5. The substance mixture of claim 4, wherein the substance mixture further comprises a sweetener.

6. A beverage comprising:
(a) sodium carboxymethyl cellulose having a molecular weight of from 15 to 90 kDa;
(b) a bitter principle selected from leucine, valine, isoleucine, or a mixture thereof; and
(c) optionally, a dextrin; and
(d) water;
provided that components (a) and (b) are present in a weight ratio of from 1:2 to 1:50 ((a):(b)), and the sodium carboxymethyl cellulose provides a viscosity of 15 mPas to 100 mPas in a 2 wt. % aqueous solution at 25° C.; and
further provided that that the sodium carboxymethyl cellulose of (a) masks bitterness of the bitter principle of (b).

7. The beverage according to claim 6 comprising the dextrin of component (c) and the dextrin has a DE value of from 5-20.

8. The beverage according to claim 6, further comprising a taste-influencing substance.

9. The beverage of claim 6, further comprising a sweetener.

10. A beverage comprising:
(a) sodium carboxymethyl cellulose having a molecular weight of from 15 to 90 kDa;
(b) a bitter principle selected from leucine, valine, isoleucine, and a mixture thereof;
(c) a dextrin having a DE value of from 5-20;
(d) water; and
(e) optionally, a taste-influencing substance;
provided that components (a) and (b) are present in a weight ratio of from 1:2 to 1:50 ((a):(b)), and the sodium carboxymethyl cellulose provides a viscosity of 15 mPas to 100 mPas in a 2 wt. % aqueous solution at 25° C.; and
further provided that that the sodium carboxymethyl cellulose of (a) masks bitterness of the bitter principle of (b).

11. The beverage of claim 10, further comprising a sweetener.

* * * * *